Oct. 19, 1937. H. A. BRASSERT 2,095,965
MANUFACTURE OF WROUGHT IRON
Filed July 30, 1932 9 Sheets-Sheet 2

INVENTOR
Herman A. Brassert
by
his attorneys

Oct. 19, 1937.　　　H. A. BRASSERT　　　2,095,965
MANUFACTURE OF WROUGHT IRON
Filed July 30, 1932　　　9 Sheets-Sheet 4

INVENTOR
Herman A. Brassert
by Byrnes, Stebbins, Parmelee & Blenks
his attorneys Oct. 19, 1937.  H. A. BRASSERT  2,095,965
MANUFACTURE OF WROUGHT IRON
Filed July 30, 1932   9 Sheets-Sheet 5

INVENTOR

Oct. 19, 1937.  H. A. BRASSERT  2,095,965
MANUFACTURE OF WROUGHT IRON
Filed July 30, 1932   9 Sheets-Sheet 6

INVENTOR
Herman A. Brassert
by Byrnes, Stebbins, Parmelee & Blenko
his attorneys

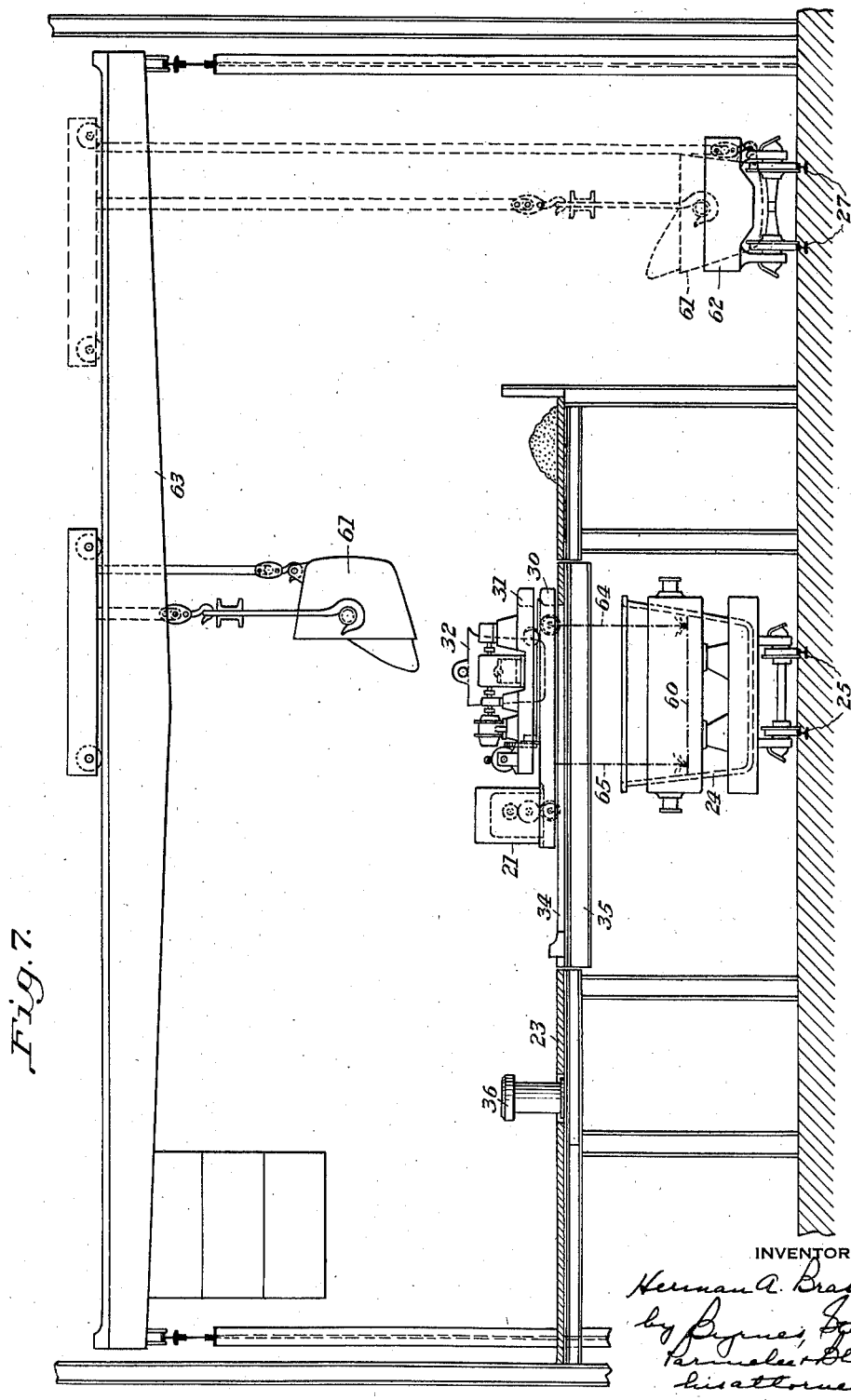

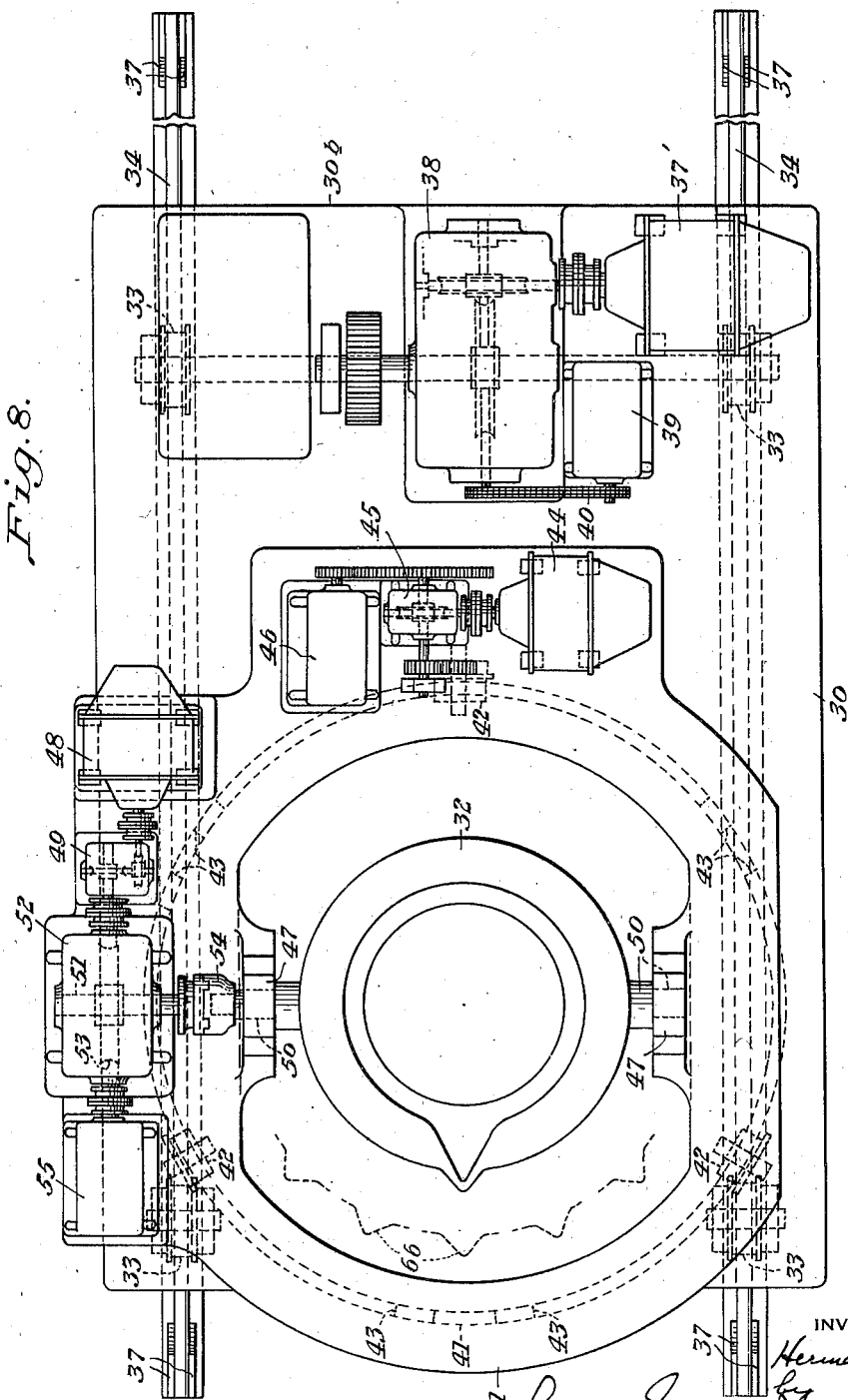

Oct. 19, 1937.　　　H. A. BRASSERT　　　2,095,965
MANUFACTURE OF WROUGHT IRON
Filed July 30, 1932　　　9 Sheets-Sheet 9
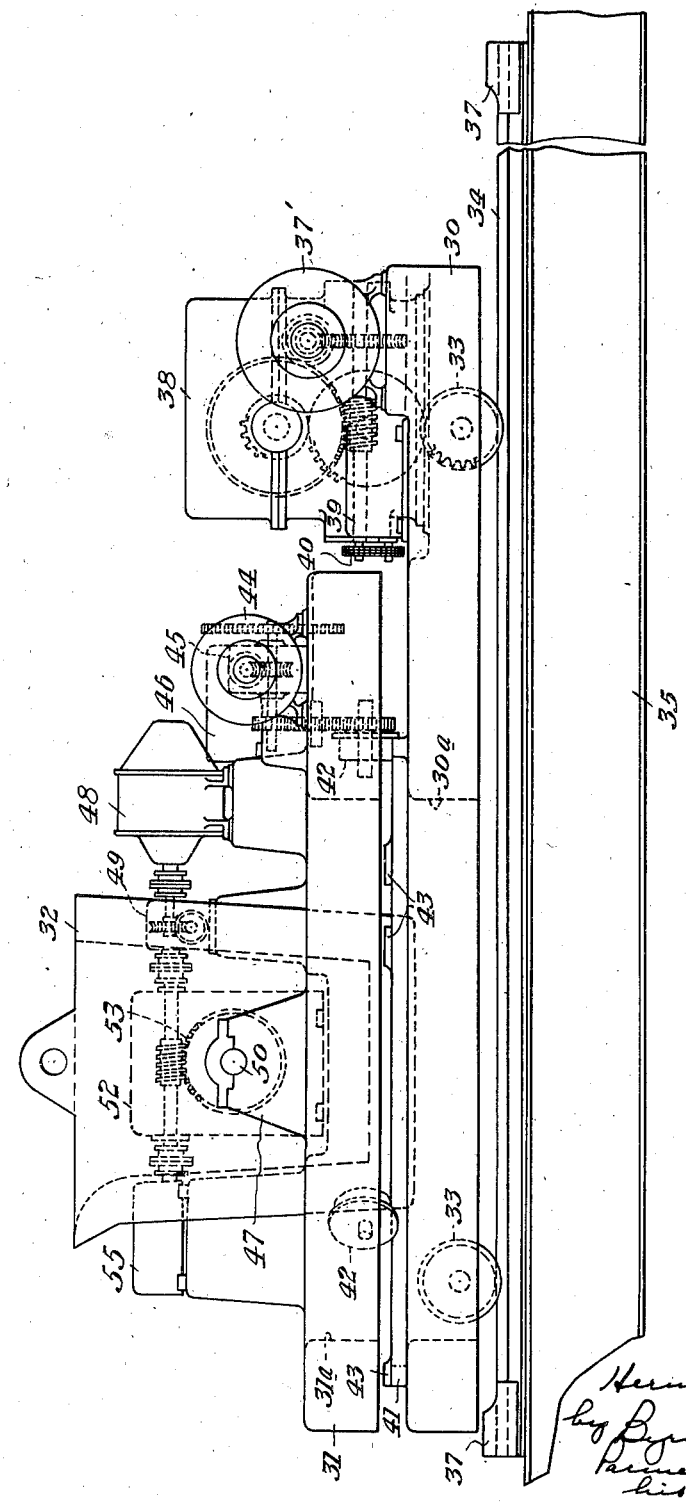

Patented Oct. 19, 1937

2,095,965

UNITED STATES PATENT OFFICE 2,095,965

MANUFACTURE OF WROUGHT IRON

Herman A. Brassert, Chicago, Ill., assignor to A. M. Byers Company, Pittsburgh, Pa., a corporation of Pennsylvania Application July 30, 1932, Serial No. 626,984

7 Claims. (Cl. 75—47)

This invention relates broadly to the manufacture of wrought iron, and more particularly to the manufacture of wrought iron in accordance with the now well known Aston process. The invention further relates to certain improvements in the manufacture of wrought iron and which are particularly adaptable to the Aston process. The invention still further relates to certain improved methods of and apparatus for the manufacture of wrought iron, which methods and apparatus result in numerous advantages over the manufacture of wrought iron by the Aston process as heretofore known.

The Aston process for the manufacture of wrought iron is now well known and, in a preferred manner of procedure, comprises pouring molten ferrous material into a slag bath so that the solidified or partly solidified granules of ferrous material formed during the pouring are individually coated with slag and welded together to form at the bottom of the slag receptacle a compressible mass or "ball" of wrought iron. The ball thus formed can be compressed to form a bloom which may then be rolled or reduced to a billet or any other desired form.

In order to insure the uniform distribution of the molten ferrous material throughout the slag, and to avoid excessive heating of any one portion of the latter, there have been devised certain methods of and apparatus for automatically pouring molten ferrous material into a slag bath in such a manner that the desired result is obtained. Such methods are specifically described and claimed in Wille Patent No. 1,890,660, granted December 13, 1932, and such apparatus is specifically described and claimed in Wille Patent No. 1,933,577, granted November 7, 1933.

I have devised certain methods of procedure and certain arrangements of equipment used in the manufacture of wrought iron by the Aston process designed to facilitate the operations, reduce the amount of time required for the completion thereof so that the process may be carried out more efficiently and more expeditiously, and otherwise increase the efficiency of the operation and maintain the high standard of quality of the product.

I provide a plant for the manufacture of wrought iron comprising means for supplying molten ferrous material, means for supplying slag, a press, and one or more "shotting machines." Each shotting machine preferably comprises a reciprocable platform carrying a table adapted for rotary movement. A tiltable ladle is preferably supported on the table and means are preferably provided for reciprocating the platform, rotating the table and tilting the ladle, all of said operations being preferably performed automatically. The reciprocable platform is preferably supported by the beam of a platform scale so that the amount of ferrous material poured from each machine into a receptacle of slag positioned therebeneath may be accurately determined, and means are preferably provided in connection with the scale for indicating the weight of ferrous material being poured during the pour so that the rate of pour can be controlled.

In the plant arrangement previously mentioned, a track is preferably provided to connect the slag furnace or furnaces and shotting machine or machines and to lead to a slag transfer station, preferably adjacent a ball press, whereby cars carrying slag receptacles may be readily shifted from one point in the plant to another. Briefly, the arrangement in a present preferred embodiment is such that empty slag receptacles may be positioned adjacent the slag furnace to receive a charge of slag. The cars are then moved to position the slag receptacles beneath the shotting machines which pour the required amount of molten ferrous material into the slag and distribute it therethrough. In order to increase the speed of production I employ a plurality of shotting machines whereby several slag receptacles may simultaneously receive a charge of molten ferrous material into their respective slag contents. The cars are shifted from the shotting machines, excess slag is transferred from the slag receptacles and the balls are removed therefrom adjacent the press for treatment therein. Preferably the excess slag is decanted from each slag receptacle, and it is found highly advantageous to transfer the excess slag, either by decantation or otherwise, into another slag receptacle disposed at the same level, preferably directly, and this may conveniently be done by lifting and tilting the slag receptacle, and, after the desired quantity of excess slag has been removed, dumping out the ball, preferably directly into the press. This feature is described and claimed in the copending application of James Aston and myself, Serial No. 626,985, filed of even date herewith. The excess slag is preferably reused for the formation of one or more additional balls, with or without additions. It is preferred to replenish the excess slag with additional molten slag. This feature is described and claimed in the copending application of James Aston and Edward B. Story, Serial No. 626,986, filed of even date herewith.

The means for supplying molten ferrous material may be of any suitable or well known type, and in the production of limited quantities of wrought iron I find that certain advantages are obtained by using one or more cupolas wherein the metal is melted and one or more Bessemer converters to which the melted metal is transferred for refining. The converter or converters may be tapped into a transfer receptacle which delivers the refined metal to the shotting machines.

The invention may be fully understood by reference to the accompanying drawings taken in connection with the following description, the drawings illustrating a present preferred embodiment of the invention which is nowise to limit the scope thereof as it is intended merely as an example. Other details, objects and advantages of the invention will become apparent as the description proceeds.

In the drawings:

Fig. 7 is a vertical transverse cross-sectional view taken along the line VII—VII of Fig. 6, showing parts in elevation;

Fig. 8 is a plan view of one of the shotting machines; and

Fig. 9 is a side elevation thereof.

Figure 1:
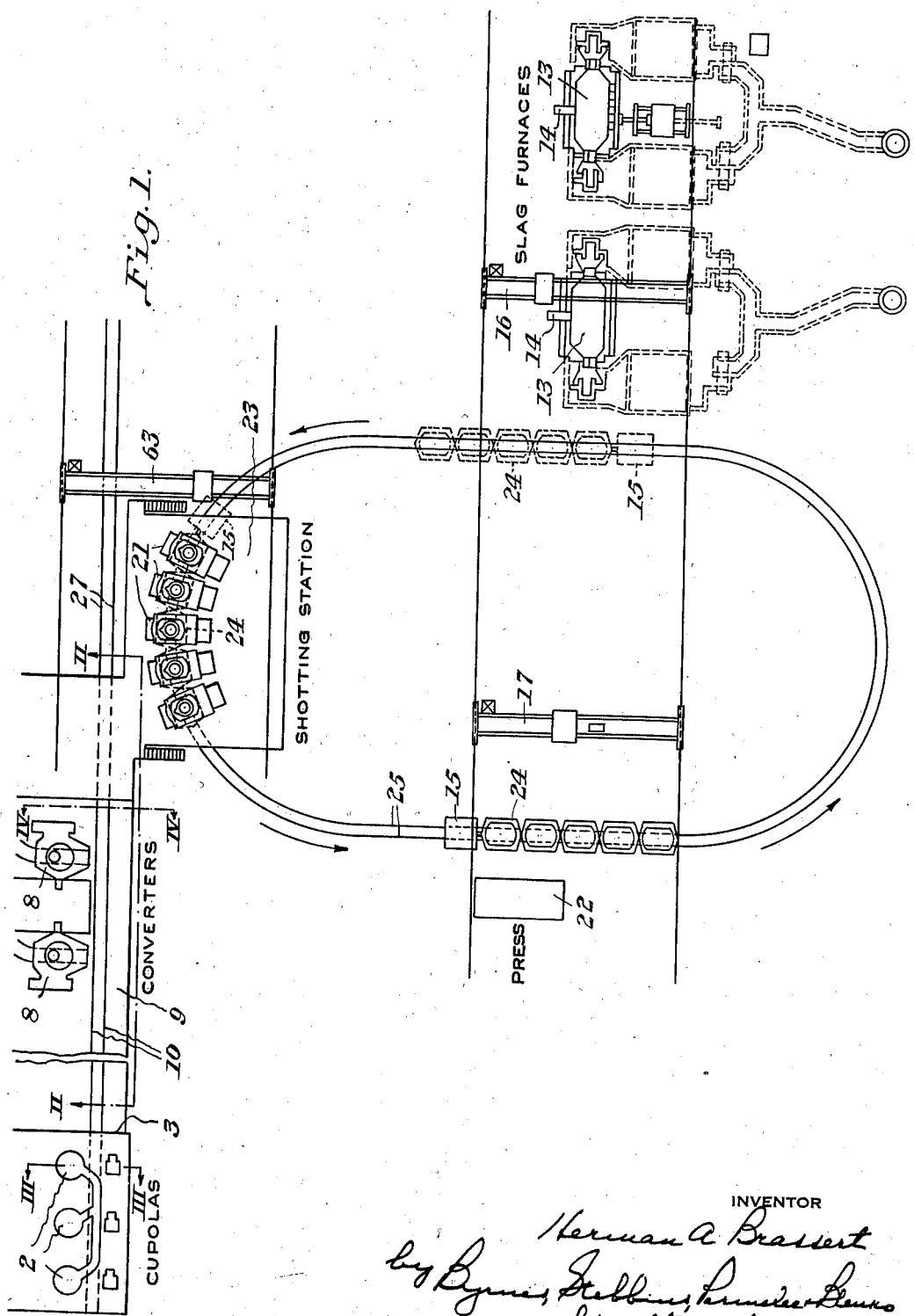
Fig. 1 is a schematic diagram of a plant layout which I have provided for the rapid and efficient production of wrought iron by the Aston process.
Figure 2:
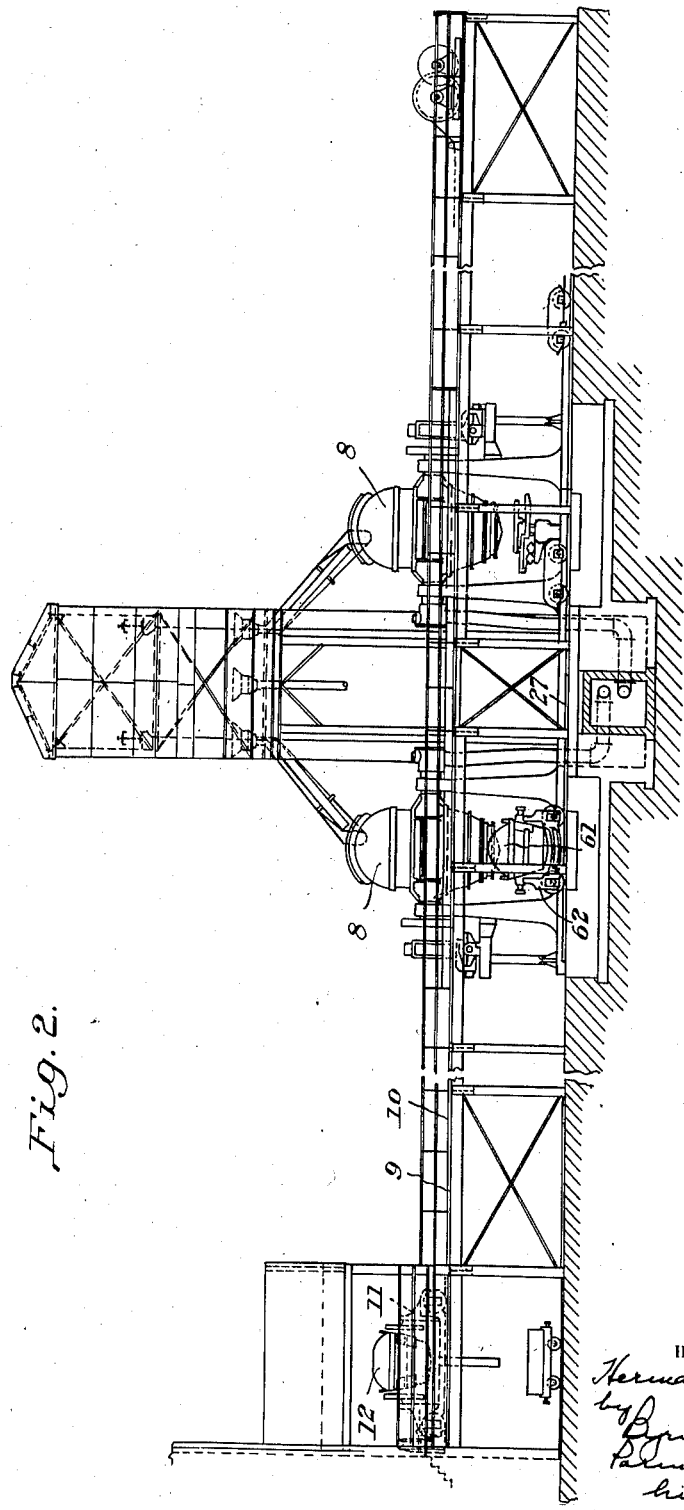
Fig. 2 is a longitudinal elevational view to enlarged scale of a portion of the layout represented in Fig. 1, such as might be taken along the line II—II of Fig. 1.
Figure 3:
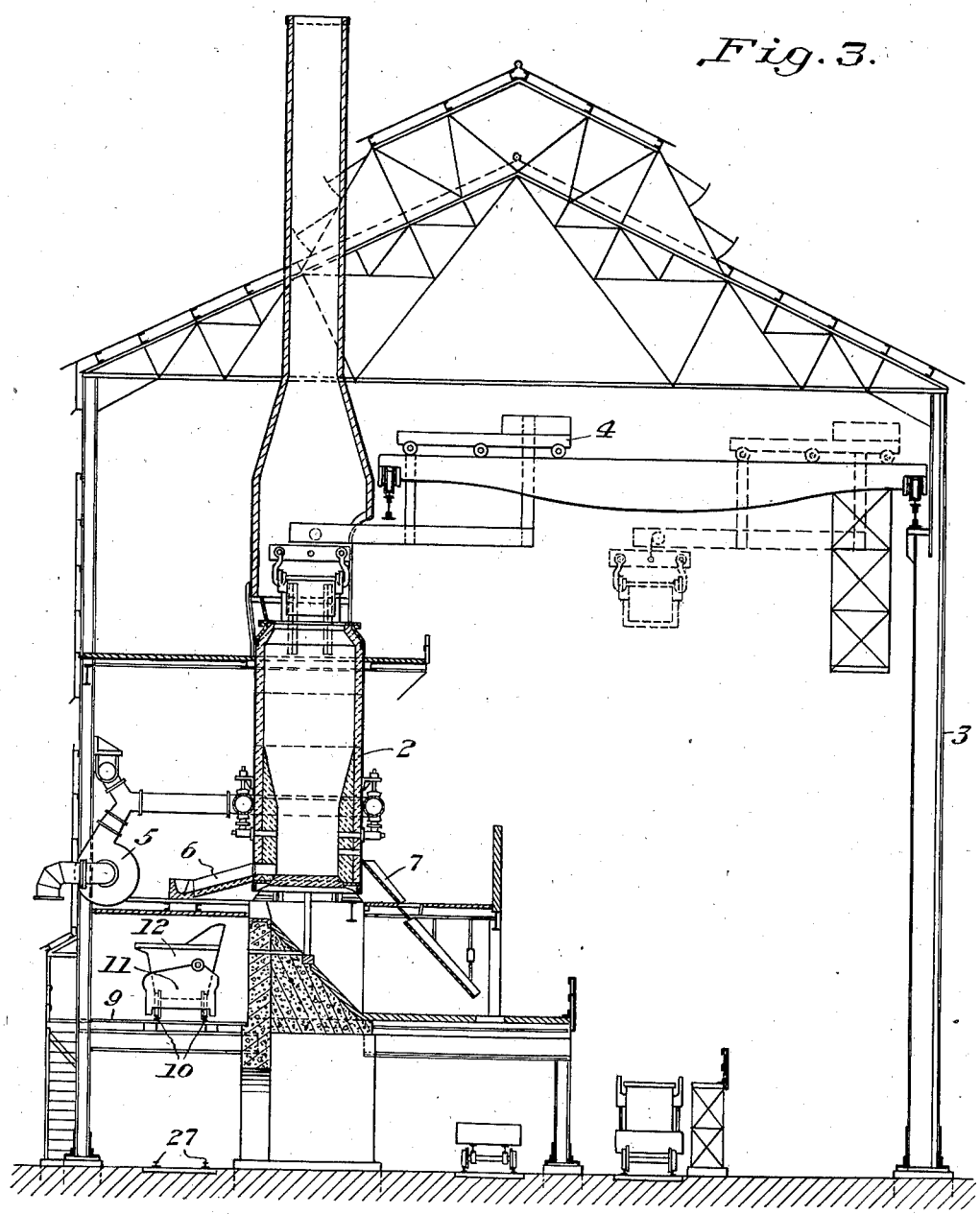
Fig. 3 is a vertical cross-sectional view to enlarged scale of a portion of the layout represented in Fig. 1, such as might be taken along the line III—III of Fig. 1.

Referring more particularly to the drawings, there are provided three cupolas, designated generally by reference numeral 2, erected within an enclosure 3 and which may be of standard or well known construction. Means 4 is provided for charging the cupolas. The air for the cupolas is supplied by one or more fans 5. The metal run-off is shown at 6 and the slag run-off at 7. As no novelty is claimed for the specific construction of the cupolas, the above general description of them will suffice.

There are also provided two Bessemer converters which may be of standard or well known construction, such converters being designated generally by reference numeral 8. The usual converter accessories are provided, and in view of the fact that no novelty is claimed for the specific construction of the converters, they need not be described in further detail.

Figure 4:
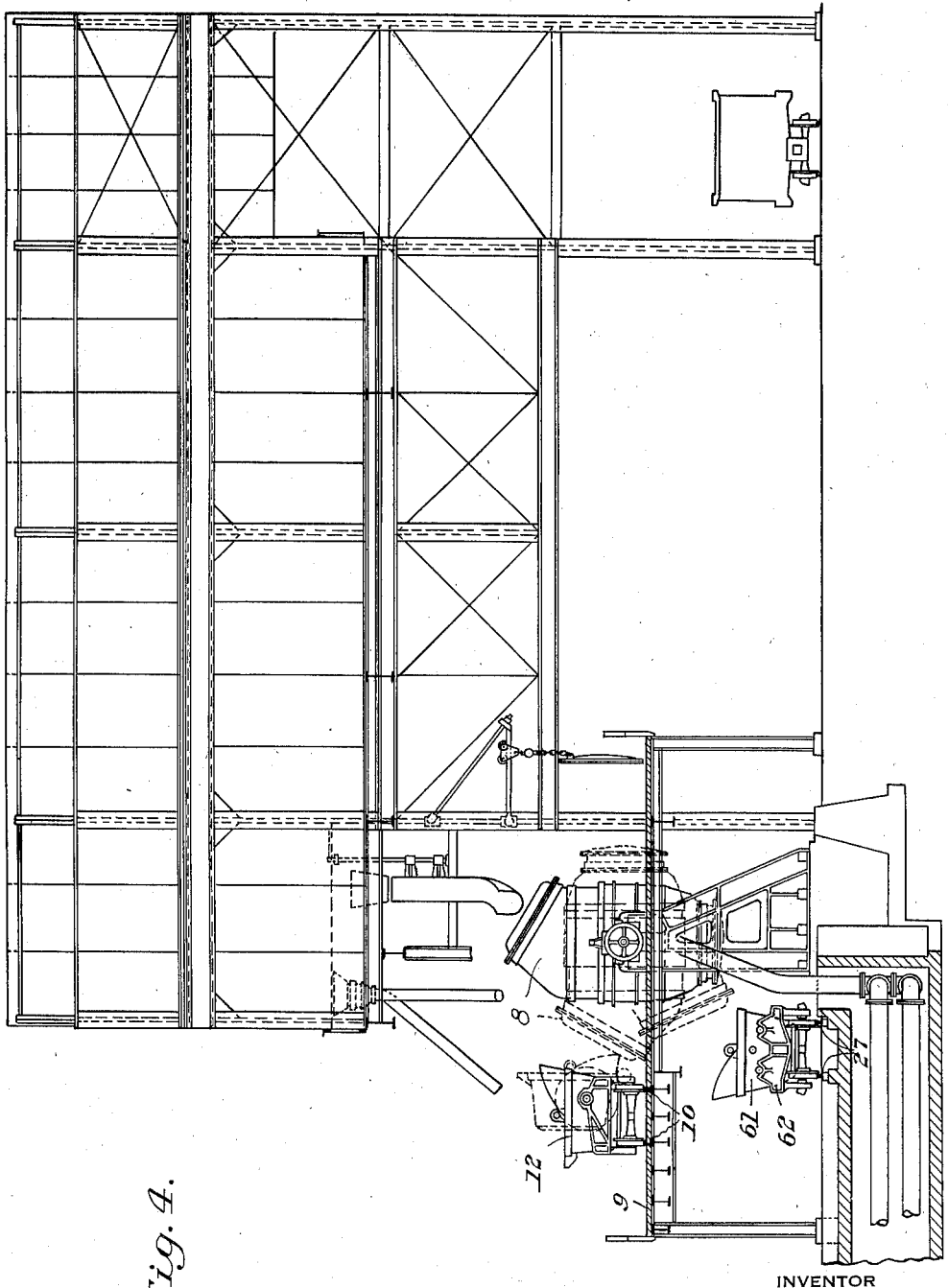
Fig. 4 is a vertical cross-sectional view to enlarged scale of a portion of the layout represented in Fig. 1, such as might be taken along the line IV—IV of Fig. 1.

A platform 9 is provided which extends longitudinally from the cupolas past the converters. A track 10 is provided on the platform, such track extending from a point beneath the metal runouts of the cupolas past the converters. A transfer car 11 provided with a tilting ladle 12 operates on the track 10. The molten metal from the cupolas is tapped into the transfer ladle 12, the slag is raked off and the metal is otherwise treated as may be desired, and the car 11 is then moved to a position opposite one or the other of the converters 8 and the molten metal is poured into such converter, as indicated in Fig. 4. The converter is then rotated to blowing position and the metal is Bessemerized or refined.

The cupolas may be tapped alternately, the three cupolas furnishing approximately the right amount of metal to keep the converters in operation. The converters may be operated alternately or their operation may be staggered, one converter blowing while the other is being tapped and charged. If smaller capacity is desired one of the converters may be used alone and one or two of the cupolas shut down. In any event, the mechanism described produces batches of refined ferrous material at spaced intervals. The amount of material in each batch and the intervals between batches will be controlled so as to coordinate with the shotting apparatus presently to be described.

There are provided a pair of slag furnaces, designated generally by reference numeral 13, which are preferably of the tilting open hearth type and which are provided with run-outs 14. These furnaces may be of standard or well known construction, and as no novelty is claimed for their specific construction, they will not be described in detail.

The slag furnaces produce an iron oxide silicate slag suitable for the formation of wrought iron in accordance with the Aston process. If smaller capacity is desired one of the furnaces may be used alone. In any event, whether one or both of the furnaces are used, quantities of molten slag are available at spaced intervals so as to coordinate with the other units of the plant, as will presently be described.

There are provided a plurality of shotting machines designated generally by reference numeral 21 and a press designated generally by reference numeral 22. The shotting machines 21 are mounted on a working floor or platform 23 which may conveniently be at the same level as the platform 9 and may form a continuation thereof. Trains of slag receptacle cars 24 are adapted to be moved past the furnaces, the shotting machines and the press on a track 25 by means of any suitable source of motive power. An electric locomotive 15 may conveniently be used for this purpose. The track 25 is preferably disposed at the working level of the plant, taken as a whole, which is a substantial distance below the level of the working floor 23 and may conveniently be at the level of the track 27, presently to be described.

Figure 6:
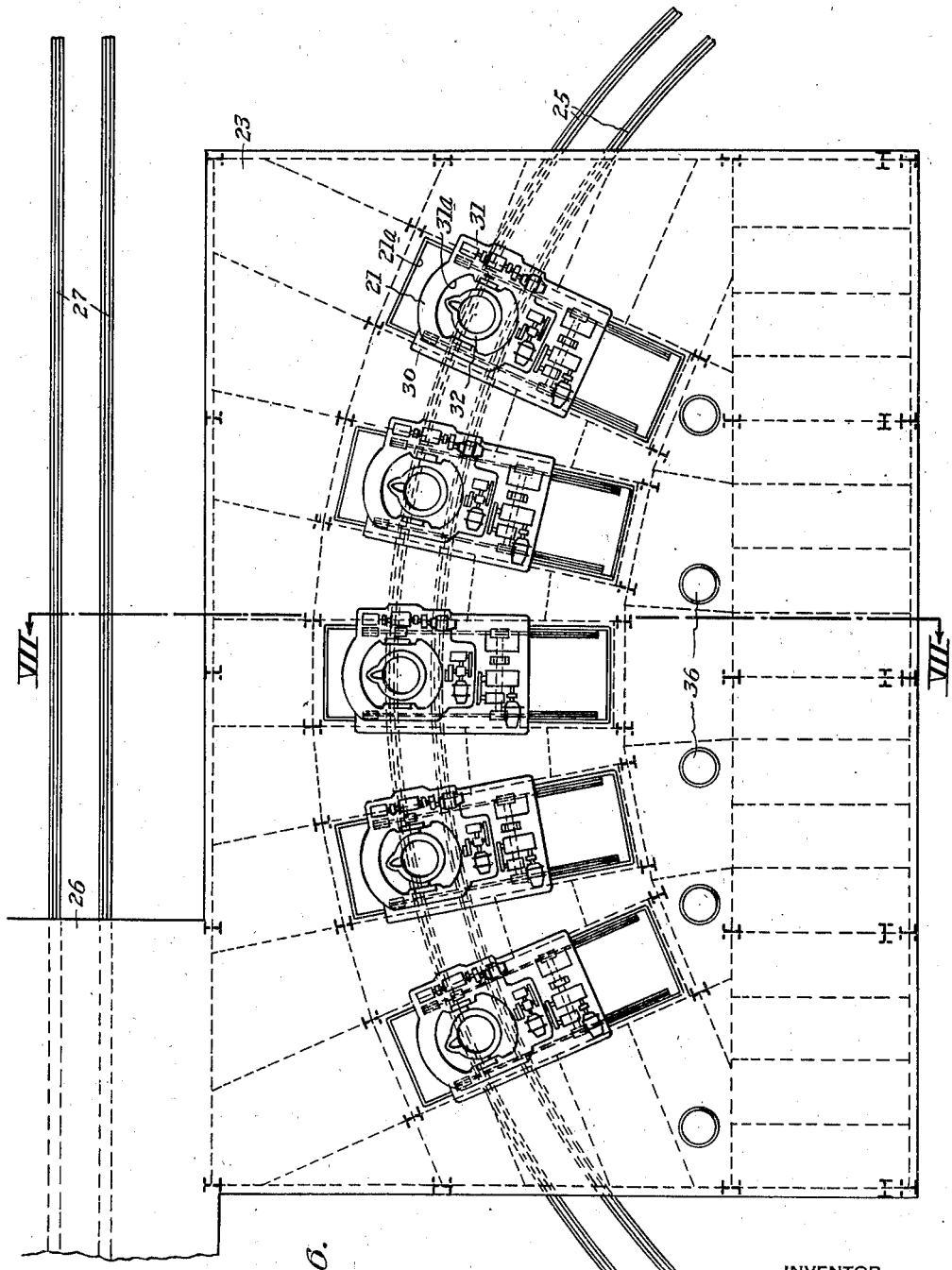
Fig. 6 is a plan view to enlarged scale of a portion of the layout represented in Fig. 1.

The shotting machines proper are illustrated in Figs. 6 to 9, inclusive, Figs. 6 and 7 showing the general arrangement of the machines in the plant and Figs. 8 and 9 illustrating the details of their construction. In general, each shotting machine consists of a reciprocable platform 30, a table 31 adapted for rotary movement on the platform and a ladle 32 tiltably mounted on the table 31. The platform 30 has an opening 30ª therein and is provided with wheels 33 which rest on rails 34 to permit reciprocation of the platform. The rails 34 are carried by the beam 35 of a platform scale having an indicating dial 36. Suitable stops 37 shown in Fig. 8 limit the reciprocating movement of the platform 30. As shown in Fig. 6 the shotting machines 21 overlie openings 21ª in the floor 23 and the rotary table 31 of each machine has a circular opening 31ª therein of the same size as the opening 30ª in the platform 30 so that it is possible, by tilting the ladle 32, to pour metal therefrom through the opening 31ᵃ in the table, the opening 30ᵃ in the platform 30, and the opening 21ᵃ in the floor 23, into a receptacle beneath the machine.

The means for reciprocating the platform 30 includes an electric motor 37' and reduction gearing 38 which serves to connect the motor to the axle to which the wheels 33 at the end 30ᵇ of the platform 30 are secured. A limit switch 39 is connected to the reduction gearing 38 by a chain and sprocket drive 40 and causes the motor 37' to be reversed at the limits of movement of the platform 30 so as to prevent over-travel thereof and insure continuous reciprocation.

The platform 30 has a circular track 41 surrounding the opening 30ᵃ in the platform. The table 31 is provided with wheels 42 engaging the track 41 so that the table may be given a rotary movement with respect to the platform 30. Stops 43 prevent over-travel of the table and automatic means for oscillating the table on its track include a motor 44 and reduction gearing 45 connecting the motor to one of the wheels 42. A limit switch 46 is driven from the reduction gearing and reverses the motor 44 periodically so that the table 31 executes an oscillatory movement.

The ladle 32 has trunnions 50 in bearings 47 on the platform 31 which carries means for tilting the ladle 32 comprising a motor 48 and reduction gearing 49. A tilting shaft 51 is journalled in a housing 52 and carries a tilting gear 53 which is in mesh with the reduction gearing 49. A clutch 54 normally connects the tilting shaft 51 and one of the ladle trunnions 50. A limit switch 55 is driven by the reduction gearing 49 to prevent excessive tilting of the ladle 32.

The various reduction gears and the limit and reversing switches previously mentioned are well known devices and are not described in detail for that reason. The arrangement of the reduction gears is indicated on the drawings and will be obvious from an inspection thereof. The limit and reversing switches 39, 46 and 55 are arranged to be driven from their respective reduction gears 38, 45 and 49 at a speed such that the operations of the various members of the shotting machine will be properly coordinated. These arrangements, however, are subject to change depending upon the size of the charge and other factors. The stroke of the platform 30, the angular movement of the table 31 and the tilting movement of the ladle 32 may be adjusted to suit different sizes of slag receptacles and charges of different weights. Variations in the extent of movement of the shotting machine produce different distributions of the molten ferrous material in the slag bath.

Any number of the shotting machines may be used, depending upon the capacity of operation desired. Previous to the shotting operation of any given shotting machine a slag receptacle carried on one of the slag receptacle cars 24 is placed directly beneath the shotting machine. Prior to being placed beneath the shotting machine, however, such slag receptacle is provided with a quantity of molten slag either from the slag furnaces or from excess slag from another slag receptacle, or both.

Considering, for example, initiation of operation of the plant, and assuming that only two of the shotting machines are to be operated, a quantity of suitable molten slag is first prepared in one of the slag furnaces, and such furnace is tapped either into a ladle (not shown) carried and manipulated by an overhead crane 16, which ladle in turn supplies the slag to two slag receptacles mounted on cars positioned on the track adjacent the slag furnaces, or into the two slag receptacles themselves, in which case the slag receptacles are lifted from the cars by the overhead crane and in turn held in position to receive the slag tapped from the furnace. The two slag receptacles may be filled with slag approximately up to the point indicated by the line 60. The cars carrying such two slag receptacles are then moved along the track 25 in the direction of the arrows until the receptacles lie directly beneath the two shotting machines which are to operate as above stated.

Meanwhile molten ferrous material has been prepared in one of the cupolas and has been transferred as above explained to one of the Bessemer converters where it is refined. After completion of the refining operation the converter discharges its contents into a label 61 removably mounted on a car 62 movable longitudinally on a track 27 which extends to a position directly opposite the shotting machines (see Fig. 1). The car 62 is then moved along the track 27 to a position approximately opposite the two shotting machines which are to operate, at which point the ladle 61 is picked up by an overhead crane 63 and a portion of its contents is poured into the ladle 32 of each of the shotting machines which is to operate.

The amount of ferrous material poured into each shotting machine is determined by the scale upon which the shotting machine is mounted. An operator on the platform watches the scale dial 36 and signals the crane operator when to stop pouring. If convenient the ladle 61 may be completely emptied into the two shotting machine ladles, although if it should be desired to introduce into the shotting machine ladles less than all of the material in the ladle 61, such ladle containing the residue of the molten ferrous material is withdrawn and the molten ferrous material may be maintained in the ladle 61 until the succeeding shotting operation, when it may be poured into one or more of the shotting machine ladles. This procedure is of advantage when, for example, it is desired to pour relatively small amounts of molten ferrous material into the shotting machine ladles for the purpose of forming relatively small balls of wrought iron. It would be undesirable to proportionately reduce the amount of material in a converter heat, and one converter heat may thus be used for more than one shotting operation. The molten ferrous material in the ladle 61 remains hot enough so that if there is no undue delay before the next shotting operation it may be made use of just as though it had originally been poured into the shotting machine ladles.

The shotting machines are now ready for the commencement of their operation, which operation is initiated by simultaneously starting the motors 37', 44 and 48. The starting and control circuits and devices for these motors are standard equipment and are not described in detail. When the motors 37', 44 and 48 are started, the platform 30 of each shotting machine is reciprocated on its wheels 33 along the rails 34. Simultaneously, the table 31 is oscillated on its wheels 42 resting on the track 41. A tilting movement is likewise imparted to the ladle 32 so that the latter reciprocates longitudinally with the platform 30, oscillates about the vertical axis of the table 31 and is tilted about its own horizontal axis. By properly adjusting the limit switches controlling the movement of the platform and table, the stream of molten ferrous material poured from the ladle 32 may be caused to trace paths of different shapes.

The pouring of the molten ferrous material from the shotting machine ladle into the slag receptacle is fully described and illustrated in said Wille patents, and as the specific manner of pouring forms no part of the present invention it will not be described here in detail.

Since different amounts of metal are required for the formation of balls of different weights, pouring will start at different points in the tilting movement of the ladle in accordance with the amount of metal in the ladle. The ladle may be tilted to the pouring position before the platform reciprocation and table oscillation are commenced in order to insure that the stream will strike the slag bath surface at the same point in the beginning of each complete operation. The speed of tilting the ladle is preferably adjusted so that the pouring rate is approximately 1000 pounds per minute. At the beginning of the pour the slag receptacle is approximately half full and at the end of the pour the slag and ball may practically fill the receptacle to the top.

In a preferred embodiment of the invention I have provided for a maximum travel of the platform of eight feet. When it is desired to manufacture balls of smaller sizes, however, the stroke of the platform may be reduced by properly adjusting the limit and reversing switches.

After the required amount of ferrous material has been introduced into each slag receptacle the cars 24 are removed from beneath the floor 23 to a convenient position for removal of excess slag. It is preferred to remove excess slag at a position adjacent the press 22, and such position will for convenience be called the slag transfer station. It is found desirable to remove excess slag by decanting and to this end it is convenient to lift the slag receptacle and tilt it. An overhead crane 17 may conveniently be used for this purpose. Excess slag will thereby be decanted from the receptacle, the ball remaining therein.

Figure 5:
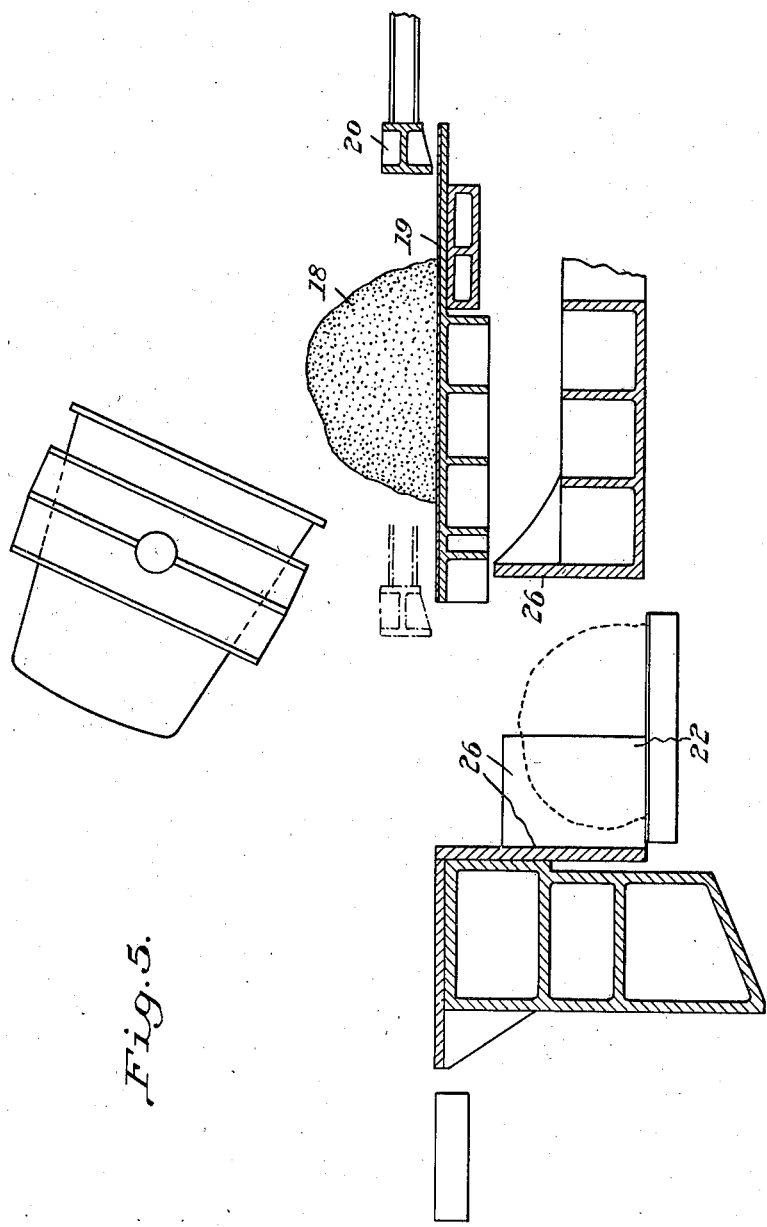
Fig. 5 is a diagrammatic view showing the dumping of a ball into the press and the disposal thereof in the pressing chamber.

The ball is removed from the slag receptacle to the press, this preferably being done by substantially inverting the slag receptacle and dumping out the ball. I prefer to dump the ball directly into the press and then to compress it to form a bloom of wrought iron which may then be given any desired treatment, such as rolling, to produce wrought iron articles. In Fig. 5 the wrought iron ball or sponge 18 is shown as having been dumped onto the press reception plate 19 from which it is pushed toward the left, viewing Fig. 5, by the pusher 20 until it falls into the pressing chamber. In the pressing chamber it is compressed by several movable rams 26 into a bloom of the desired shape.

As the wrought iron is adapted for fabrication into many different products of different sizes and shapes, and as unfinished shapes such as billets, slabs, etc., of different sizes are desirable for producing the various finished articles, it is likewise desirable to produce in the blooming mill billets and slabs of various different cross-sections and lengths. However, it is impracticable to attempt to form in a blooming mill widely different sizes and shapes of slabs and billets from blooms of standard size. Therefore, I provide for supplying blooms of various sizes, and as the size of a bloom depends upon the size of the wrought iron sponge or ball, balls of different sizes are made to conform with the products to be rolled on the blooming mill.

While it is ordinarily desirable to empty a shotting machine ladle at each shotting operation, nevertheless if relatively small balls are to be formed the shotting machine ladle may be only partly emptied during one shotting operation and may be completely emptied upon the succeeding operation, or the residue remaining in it after the first shotting operation may be replenished by additional molten ferrous material and part or all of the aggregate thus formed may be poured into the slag bath upon the succeeding shotting operation. The provision of the scale makes possible close control of the size of the ball even though only part of the ferrous material is poured out of the shotting machine ladle into the slag bath at one shotting operation, and even though the ferrous material is replenished before the succeeding shotting operation.

It sometimes happens that a relatively small quantity of slabs or billets of a particular size is desired, such, for example, that one small ball would provide a bloom suitable for rolling into the desired quantity of slabs or billets of the size in question. I therefore provide for dividing a heat of refined metal into unequal portions. A small ball and a relatively large ball, for example, may be formed at the same time. The small ball produces a small bloom which, in turn, is suitable for rolling in the blooming mill into the desired number of slabs or billets of the desired size. If the entire heat were utilized for the formation of balls of the same size this desirable result would not be possible. Likewise, the desirable result would not be possible if all of the balls made at one shotting operation should be of the same size.

The provision of the scale also makes possible regulation and control of the rate of pour. As a shotting machine ladle is progressively emptied during shotting, the operator on the platform by watching the scale dial can observe the decrease in weight of the shotting ladle and contents, which is equivalent to the weight of the ferrous material poured into the slag bath. By suitably controlling the tilting of the ladle a desired rate of pour can be obtained. The rate of pour is preferably maintained uniform, although if for any reason it should be desired to do so the rate could be altered during the pour. Certain methods of and apparatus for controlling the pour are described and claimed in the copending application of Edward B. Story and William T. Case, Serial No. 628,125, filed August 10, 1932.

It is preferred to have a second slag receptacle at the slag transfer station during decanting of each slag receptacle and to decant the excess slag directly into the second receptacle. The second receptacle is preferably at the working level, that is to say, the same level occupied by the first slag receptacle before it is lifted for decanting. This eliminates the provision of a plurality of working levels at the slag transfer station.

It is convenient to utilize a train comprising at least one more slag receptacle car than there are shotting machines in operation. For example, with two shotting machines in operation it would be preferable to use a three-car train, two of the cars having slag receptacles provided with slag and the third car having an empty slag receptacle. After completion of the shotting operation and removal of the train to the slag transfer station one of the filled receptacles would first decant its excess slag into the empty slag receptacle and then dump out its ball into the press. Then the second filled slag receptacle would decant its excess slag into the slag receptacle just emptied and dump its ball into the press, the last slag receptacle emptied being used as the empty slag receptacle for the succeeding shotting operation. If desired, the last slag receptacle can be held at the slag transfer station until the return of the two cars having filled receptacles after the succeeding shotting operation, whereupon such empty receptacles can be placed on its car and the decanting procedure above described repeated. It is sometimes preferable, in order to equalize heat transfer, to use twice as many slag receptacle cars as there are shotting machines in operation so that each slag receptacle will be alternately filled and empty.

The excess slag is preferably reused while still molten for the formation of one or more additional balls. The slag receptacle containing the excess slag is returned to the shotting or pouring station where the shotting or pouring operation is repeated. By the use of my improved processes I am able to speed up the operation sufficiently that I can eliminate the measures previously taken to conserve the heat of the slag. It has heretofore been proposed to conserve the heat of the slag by using a heat insulated slag receptacle, this having been found necessary or desirable when the operation was carried out so slowly that there was danger that the slag would be too low in temperature for proper ball formation by the time the subsequent shotting operation could be carried out. The provision of insulated slag receptacles entailed additional expense and was also the cause of operating difficulties, and I eliminate these disadvantages by doing away with the insulation for the slag receptacles and returning the slag receptacle with the excess slag to the pouring station so quickly that the slag remains at proper temperature. I therefore propose to use uninsulated slag receptacles. Furthermore, uninsulated receptacles need not be handled so carefully as insulated receptacles and this aids in speeding up the operation.

By uninsulated slag receptacles I mean slag receptacles which do not have insulating material applied previously to their use and of a different character than material contained within the receptacles during use. The slag receptacles used in my process may acquire a skull or lining of solidified slag which may have insulating properties, but such skull or lining does not make my receptacles insulated receptacles within the meaning intended.

Additions may be made to the slag before reuse, and it is preferred to replenish the molten slag with additional molten slag from the slag furnace, and preferably with molten slag having the same characteristics or whose analysis is approximately the same as that of the excess slag. To this end I move the slag receptacle containing the excess slag along the track in the direction of the arrows in Figure 1 to a position adjacent the slag furnace, which position may be termed a slag supply station, where additional slag from the furnace is introduced into the slag receptacle.

The slag temperature can be controlled by replenishment with molten slag from the slag furnace. During the shotting operation the ferrous material, being hotter than the slag, gives up heat to the slag and the slag therefore becomes appreciably hotter and may become undesirably hot, that is to say, so hot that the proper temperature differential would not be obtained if it should be attempted to again pour ferrous material into the excess slag. On account of the rapidity with which I am enabled to carry out the operation by using my improved processes the excess slag may not cool down to a temperature equivalent, say, to the temperature of the slag tapped from the slag furnace. Consequently the addition of a proper amount of slag from the slag furnace will bring down the temperature of the slag to such a point that the desired differential may be obtained. The temperature may be closely controlled by regulating the amount of slag added from the slag furnace.

Occasionally, due to unforseen interruptions, a batch of excess slag may have to stand so long as to become undesirably cool. As above mentioned, the temperature of such slag was formerly attempted to be maintained by the use of heat insulating material in connection with the slag receptacle. However, the slag can be brought up to such a temperature that the proper differential may be obtained by adding a proper amount of slag from the slag furnace. When the excess slag has cooled down below the temperature of the slag in the slag furnace the greater the amount of slag added from the slag furnace the higher will be the temperature of the resultant mixture or aggregate. These features are described and claimed in said copending application of Aston and Story.

It is known to be desirable to form a ball having at least one horizontal dimension greater than its vertical dimension, and such a ball may conveniently be formed by utilizing my improved processes even though excess slag is returned without replenishment to the pouring station. The ferrous material may be distributed over the surface of the slag so as to produce a ball having at least one horizontal dimension greater than its vertical dimension regardless of the height of the slag in the slag receptacle during pouring. Therefore it is possible to reuse the same slag a number of times without replenishment while still obtaining highly desirable results.

The movement of the shotting machines is, of course, stopped before the slag receptacles are moved from under the machines. The ladles 32 are restored to their respective vertical positions for receiving another charge of ferrous material from the pouring ladle 61 and the entire cycle of operations may then be repeated.

I have thus provided methods and apparatus for rapidly and efficiently carrying out the Aston process for the manufacture of wrought iron. The operations of the shotting machines are largely automatic and a minimum of manual control is necessary. This makes it possible for a comparatively large installation to be controlled by few men with a resulting lowering in costs of production. The plant layout is such that the operation is of the line variety so that no unnecessary transportation of material in process is necessary.

The movement of the shotting machines is such as to secure a uniform distribution of the metal throughout the slag so that a superior quality of wrought iron is produced.

Although I have illustrated but a single preferred embodiment of my invention, I do not intend to be limited to the specific details thereof since the invention may be practiced in other forms. Minor changes and alterations will be apparent to those skilled in the art and all such changes may be made without departing from the invention as defined by the appended claims.

I claim:

1. A method of making wrought iron comprising providing a batch of ferrous material, first dividing said batch into portions in separate receptacles, and then simultaneously incorporating said portions with slag to form separate wrought iron balls.

2. Apparatus for making wrought iron comprising a plurality of scales each carrying a pouring receptacle, common means for supplying material to said receptacles, and separate receptacles adapted to receive the pour from the respective pouring receptacles.

3. Apparatus for making wrought iron comprising a shotting station, a slag transfer station, a train carrying a plurality of slag receptacles movable to said respective stations, and means for transferring at least a portion of the contents of one of said slag receptacles to another thereof while the second mentioned slag receptacle is in place on said train.

4. A method of making wrought iron comprising pouring ferrous material into a receiving receptacle containing molten slag predeterminedly positioned at a pour receiving station from a pouring receptacle having laterally rigid mounting upon a pouring floor disposed at a higher level than and fixed relatively to the pour receiving station and controlling the position of the pouring receptacle relatively to the pouring floor throughout the pour whereby to insure definite positive control of the entry of the ferrous material into the molten slag and consequent regular production of balls of high quality.

5. Apparatus for making wrought iron comprising a pour receiving receptacle adapted to be predeterminedly positioned at a pour receiving station, a pouring floor disposed at a higher level than and fixed relatively to the pour receiving station, a pouring receptacle having laterally rigid mounting upon the pouring floor and adapted to pour its contents into the pour receiving receptacle and means to predeterminedly control the position of the pouring receptacle relatively to the pouring floor throughout the pour.

6. Apparatus for making wrought iron comprising a pour receiving receptacle adapted to be predeterminedly positioned at a pour receiving station, a pouring floor disposed at a higher level than and fixed relatively to the pour receiving station, a tiltable pouring receptacle having laterally rigid mounting upon the pouring floor and adapted to pour its contents into the pour receiving receptacle, means for tilting the receptacle and means for predeterminedly controlling the tilting movement of the pouring receptacle throughout the pour.

7. Apparatus for making wrought iron, comprising means for supplying molten slag, a plurality of slag receptacles for receiving slag from said slag supplying means, means for supplying molten ferrous material, a transfer receptacle for said molten ferrous material and a plurality of pouring receptacles each adapted to receive a portion of the molten ferrous material from said transfer receptacle, said pouring receptacle being mounted relatively to said slag receptacles so as to pour molten ferrous material into slag contained therein to form balls of wrought iron.

HERMAN A. BRASSERT.